(12) United States Patent
Blair et al.

(10) Patent No.: US 7,933,866 B2
(45) Date of Patent: Apr. 26, 2011

(54) SYSTEMS, METHODS AND SOFTWARE PROGRAMS FOR DATA SYNCHRONIZATION

(75) Inventors: Ann-Louise Blair, Southport (AU); Dennis Raymond Doll, Newport Beach, CA (US); Zoran Radenkovic, Robina (AU)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/850,994

(22) Filed: Sep. 6, 2007

(65) Prior Publication Data

US 2009/0070391 A1    Mar. 12, 2009

(51) Int. Cl.
*G06F 17/30* (2006.01)
(52) U.S. Cl. .................................. 707/610; 707/612
(58) Field of Classification Search .............. 707/203, 707/610, 612
See application file for complete search history.

(56) References Cited

U.S. PATENT DOCUMENTS

| 7,039,657 | B1 * | 5/2006 | Bish et al. | 707/203 |
| 2006/0155773 | A1 * | 7/2006 | Drouet et al. | 707/200 |
| 2008/0005288 | A1 * | 1/2008 | Kodama et al. | 709/220 |
| 2009/0063494 | A1 * | 3/2009 | Amies et al. | 707/10 |

OTHER PUBLICATIONS

Article entitled "Synchronizing Data with IBM Tivoli Directory Integrator 6.1", dated Jul. 16, 2007, by Buecker et al.*
Article entitled "IBM RedBooks" by Dates on Aug. 17, 2007.*
Article entitled "IBM Tivoli Integrator" by IBM, copyright 2006.*

* cited by examiner

*Primary Examiner* — Mahesh H Dwivedi
(74) *Attorney, Agent, or Firm* — Yee & Associates, P.C.; Jeffrey S. LaBaw

(57) ABSTRACT

In contrast to prior data synchronization processes, provided by aspects of the invention are systems, methods and software programs implementing a data synchronization process that employs a high-level interface of a respective data repository to extract valid information from the data repository in response to low-level changes in the data repository. In specific embodiments of the invention, the synchronization process is implemented within an adaptor interposed between a management system and a database system that serves as a middle-ware operable to link a respective data store interface, within a management system, to a respective managed platform, within the database system, so that the native API's of each can be employed in the operation of the data synchronization process.

21 Claims, 4 Drawing Sheets

SYSTEMS, METHODS AND SOFTWARE PROGRAMS FOR DATA SYNCHRONIZATION

FIELD OF THE INVENTION

The invention relates to the management of data, and in particular to systems and methods for reconciliation of data stored in more than one location.

BACKGROUND OF THE INVENTION

A database system typically consists of a managed platform and a data repository. The managed platform serves as an interface for the database system and provides two general functions. First, the managed platform deconstructs the data in an individual record according to the schema of the database system so that the data contained in the record can be stored efficiently. Second, the managed platform reconstructs the data entries stored in the database system to provide a complete record to another system or user seeking the record. These functions are controlled by Application Program Interface commands (API's) that are processed by the managed platform. Specifically, API's are high-level commands that encompass low-level access and management operations on the data repository. Often, API's are vendor specific, so low-level access to a data repository without the use of API's directed to the managed platform may not provide valid results.

Enterprises today often contain multiple database systems, each of which may be provided by a different vendor. A management system is often included in an enterprise in order to effectively access any one of the constituent database systems and maintain the integrity of the data entries stored. The management system often includes a data store containing a local replica of at least some of the data stored in one or more database systems. In order to keep the information current, the local replica must be synchronized with data that is contained in the one or more database systems. The data synchronization process is often referred to as reconciliation.

An identity manager is but one example of a management system. Identity management in enterprises is a resource-demanding task. It involves keeping track of tens of thousands of identities across the enterprise and correlating these identities to individual employees, contractors, suppliers, customers, etc. When a change to a record is made in one portion of the enterprise, that change must be propagated through the enterprise in order to ensure that discrepancies are detected and resolved so that the data stored throughout the enterprise is current and accurate. Accordingly, an identity manager is arranged to receive information about changes made to stored data, store relevant information locally, and propagate those changes to other database systems within the enterprise.

There are a number of prior reconciliation strategies that have been developed. In a first approach, the reconciliation process includes a record-by-record comparison between the records stored in a particular database system and the management system. This approach is resource intensive and can be very inefficient when few changes have been made. According to a second approach, a data repository is monitored, and a change to the data in the data repository is considered a triggering event that initiates a synchronization process directly between the data repository and the management system. This approach is inefficient because the data extracted is often incomplete since it has not been extracted using the API's of the managed platform. As such, data provided to the management system requires several transformations to convert the low-level data extracted from the data repository to a form that can be used by the management system at a high-level. A third approach attempts to overcome the problems of the second approach by mapping changes to a data repository directly to a data store within the management system. Changes to the data in the data repository trigger a low-level synchronization process directly between the data store of the management system and the data repository rather than first transforming the data from the data repository to a form that can be used by the management system at a high-level. This approach may not be more efficient than the second approach when the storage schema employed by the data repository and the data store of the management system are different. In such cases, low-level mapping of data between the two may be as complex as the transformation of data from the data repository into a form that can be used by the management system at a high-level. Furthermore, both the second and third approaches are adversely sensitive to reconfiguration and schema changes since they require the direct use of low-level access and management operations.

SUMMARY OF THE INVENTION

According to an aspect of an embodiment of the invention, there is provided a method for synchronizing data stored in first and second data repositories, wherein each of the first and second data repositories have an interface providing native Application Program Interface commands (API's) that each encompass a suitable combination of low-level access and management operations for accessing and manipulating data within the respective data repository, the method includes: sensing a change to the data stored in the first data repository; storing a respective identification of an account affected by the change; retrieving at least a portion of the data in the account affected by the change using native API's of the interface of the first data repository and the respective identification of the account; and, communicating some of the data retrieved as an update to the second data repository using native API's of the interface of the second data repository.

In some embodiments, sensing the change to the data repository comprises receiving notification from a trigger configured to detect changes to the data stored in the first data repository and provide said notification. In more specific embodiments, the trigger is configured to monitor at least one of a change log, an audit log, a table in a database for storing change information, and a memory allocation for storing change information. In other more specific embodiments, the notification from the trigger includes the respective identification of the account affected by the change.

In some even more specific embodiments, storing the respective identification of the account affected by the change to the data stored in the first data repository includes: providing a hash table, the hash table for storing the respective identification of the account affected by the change to the data in the first data repository when the change is originally from a system managing the second data repository; and, providing a checkpoint stack for storing a sequential listing of change events detected in the first data repository, the checkpoint stack including a pointer, the pointer configured to point to the earliest change event detected in the first data repository that has yet to be processed, wherein the change events are an indication of an account or subset of accounts affected by a change to the data in the first data repository. In some even more embodiments, the method also includes: accepting an input containing an indication of a change to the data in the first data repository; determining if the indication of the change is provided by the trigger or if the indication of the change is a modify request provided by a system managing the second data repository; if the indication of the change is provided by the trigger, determining if the change can be traced to a previous modify request sent from a system managing the second data repository, and providing an update to the second data repository only if the change cannot be traced back to the modify request sent from a system managing the second data repository; and if the indication of the change is a modify request provided by a system managing the second data repository, storing a respective identification of the account affected by the change in the modify request in the hash table.

In some embodiments, the method also includes sending the modify request to the interface of the first data repository. In some other embodiments, wherein determining if a change can be traced to a previous modify request sent from a system managing the second data repository includes: pushing an indication of a change event onto the checkpoint stack; using the pointer of the checkpoint stack to identify the account corresponding to and affected by the earliest change event detected in the first data repository that has yet to be processed; determining if the respective identification of the account in the hash table; and, providing an update to the second data repository if the respective identification of the account is not in the hash table; and, otherwise, deleting the respective identification of the account from the hash table and advancing the checkpoint stack pointer to the next change event.

In some embodiments, providing an update to the second data repository includes: retrieving at least a portion of the data of the account affected by the change using the native API's of the interface of the first data repository; and, communicating a portion of the data retrieved as an update to the second data repository using the native API's of the interface of the second data repository. In some embodiments, the method includes: waiting for an acknowledgment from one of the interface of the second data repository and a system managing the second data repository; if an acknowledgment is not received after a period of time, re-sending the update to the second data repository using the native API's of the interface of the second data repository; and, once the acknowledgment is received, deleting the respective identification of the account from the hash table and advancing the checkpoint stack pointer.

In some embodiments, the method also includes: sequentially processing change events listed in the checkpoint stack until the checkpoint stack is empty; and, when the checkpoint stack is empty, processing notifications of change events as received from the trigger.

According to another aspect of an embodiment of the invention, there is provided a system for synchronizing data stored in first and second data repositories, wherein each of the first and second data repositories have an interface providing native Application Program Interface commands (API's) that each encompass a suitable combination of low-level access and management operations for accessing and manipulating data within the respective data repository, the system including: a hash table, the hash table for storing respective identification for accounts affected by a change to the data in the first data repository when the change is originally from a system managing the second data repository; a checkpoint stack for storing a sequential listing of change events detected in the first data repository, the checkpoint stack including a pointer, the pointer configured to point to the earliest change event detected in the first data repository that has yet to be processed, wherein the change events are an indication of an account or subset of accounts affected by a change to the data in the first data repository; an implementation of a data synchronization method, wherein the method includes sensing a change to the data stored in the first data repository; storing a respective identification of an account affected by the change in at least one of the hash table and the checkpoint stack; retrieving at least a portion of the data in the account affected by the change using native API's of the interface of the first data repository and the respective identification of the account; and communicating some of the data retrieved as an update to the second data repository using native API's of the interface of the second data repository.

In some embodiments, the system further includes a trigger configured to sense changes to the data stored in the first data repository and report the respective identification of the account affected by the change. In some more specific embodiments, the implementation of the data synchronization method includes: accepting an input containing an indication of a change to the data in the first data repository; determining if the indication of the change is provided by the trigger or if the indication of the change is a modify request provided by a system managing the second data repository; if the indication of the change is provided by the trigger, determining if the change can be traced to a previous modify request sent from a system managing the second data repository, and providing an update to the second data repository only if the change cannot be traced back to the modify request sent from a system managing the second data repository; and, if the indication of the change is a modify request provided by a system managing the second data repository, storing a respective identification of the account affected by the change in the modify request in the hash table.

In some embodiments, determining if a change can be traced to a previous modify request sent from a system managing the second data repository includes: pushing an indication of a change event onto the checkpoint stack; using the pointer of the checkpoint stack to identify the account corresponding to and affected by the earliest change event detected in the first data repository that has yet to be processed; determining if the respective identification of the account in the hash table; providing an update to the second data repository if the respective identification of the account is not in the hash table; and otherwise, deleting the respective identification of the account from the hash table and advancing the checkpoint stack pointer to the next change event.

In some more specific embodiments, providing an update to the second data repository includes: retrieving at least a portion of the data of the account affected by the change using the native API's of the interface of the first data repository; and communicating a portion of the data retrieved as an update to the second data repository using the native API's of the interface of the second data repository.

According to yet another aspect of an embodiment of the invention, there is provided a software product implementing a method of data synchronization between first and second data repositories, wherein each of the first and second data repositories have an interface providing native Application Program Interface commands (API's) that each encompass a suitable combination of low-level access and management operations for accessing and manipulating data within the respective data repository, the software product including computer program instructions for: sensing a change to the data stored in the first data repository; storing a respective identification of an account affected by the change; retrieving at least a portion of the data in the account affected by the change using native API's of the interface of the first data repository and the respective identification of the account;

and, communicating some of the data retrieved as an update to the second data repository using native API's of the interface of the second data repository.

In some embodiments, the software product also includes computer program instructions defining a trigger configured to detect changes to the data stored in the first data repository and provide said notification, wherein the trigger is configured to monitor at least one of a change log, an audit log, a table in a database for storing change information, and a memory allocation for storing change information, and wherein the notification from the trigger includes the respective identification of the account affected by the change.

In some more specific embodiments, storing the respective identification of the account affected by the change to the data stored in the first data repository includes computer program instructions for: providing a hash table, the hash table for storing the respective identification of the account affected by the change to the data in the first data repository when the change is originally from a system managing the second data repository; and providing a checkpoint stack for storing a sequential listing of change events detected in the first data repository, the checkpoint stack including a pointer, the pointer configured to point to the earliest change event detected in the first data repository that has yet to be processed, wherein the change events are an indication of an account or subset of accounts affected by a change to the data in the first data repository.

In some more specific embodiments, the software product includes computer program instructions for: accepting an input containing an indication of a change to the data in the first data repository; determining if the indication of the change is provided by the trigger or if the indication of the change is a modify request provided by a system managing the second data repository; if the indication of the change is provided by the trigger, determining if the change can be traced to a previous modify request sent from a system managing the second data repository, and providing an update to the second data repository only if the change cannot be traced back to the modify request sent from a system managing the second data repository; and if the indication of the change is a modify request provided by a system managing the second data repository, storing a respective identification of the account affected by the change in the modify request in the hash table.

In some embodiments, the software product also includes computer program instructions for: pushing an indication of a change event onto the checkpoint stack; using the pointer of the checkpoint stack to identify the account corresponding to and affected by the earliest change event detected in the first data repository that has yet to be processed; determining if the respective identification of the account in the hash table; providing an update to the second data repository if the respective identification of the account is not in the hash table; and otherwise, deleting the respective identification of the account from the hash table and advancing the checkpoint stack pointer to the next change event.

In some embodiments, the software product also includes computer program instructions for: retrieving at least a portion of the data of the account affected by the change using the native API's of the interface of the first data repository; and communicating a portion of the data retrieved as an update to the second data repository using the native API's of the interface of the second data repository.

In some more specific embodiments, the software product also includes computer program instructions for: waiting for an acknowledgment from one of the interface of the second data repository and a system managing the second data repository; if an acknowledgment is not received after a period of time, re-sending the update to the second data repository using the native API's of the interface of the second data repository; and, once the acknowledgment is received, deleting the respective identification of the account from the hash table and advancing the checkpoint stack pointer.

In some even more specific embodiments, the software product also includes computer program instructions for: sequentially processing change events listed in the checkpoint stack until the checkpoint stack is empty; and when the checkpoint stack is empty, processing notifications of change events as received from the trigger.

Other aspects and features of the present invention will become apparent to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

Previous approaches to data synchronization between a management system and a database system, or more generally between two data repositories, have not been able to resolve the conflict between the desire for efficient resource utilization and the practical need to interchange, reconfigure and/or upgrade components within an enterprise. Gains in efficiency often require bypassing high-level control of a database system and/or a data store within a management system in order to directly detect and react to low-level data changes. However, the data extracted from low-level access to a data repository often subsequently requires further processing and information from other sources to ensure the validity of the data.

Figure 1:
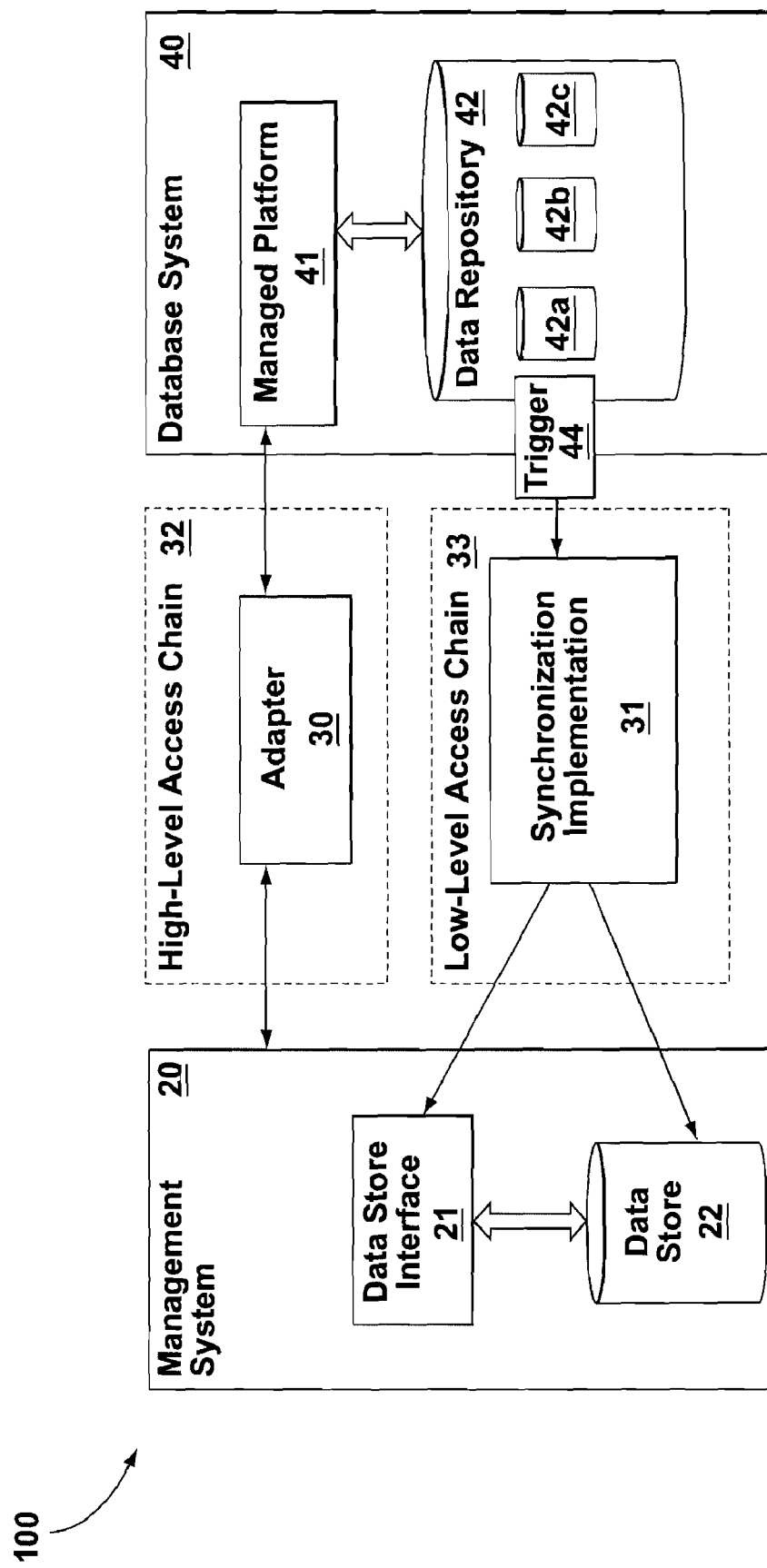
FIG. 1 is a schematic illustration of a portion of an enterprise system provided to help describe aspects of previous approaches to data synchronization.

FIG. 1 is a schematic illustration of a portion of an enterprise system 100 provided to help describe aspects of previous approaches to data synchronization (reconciliation). The enterprise system 100 includes a management system 20 and a database system 40. The database system 40 includes a managed platform 41 and a data repository 42. The managed platform 41 serves as an interface to the data repository 42, providing Application Program Interface commands (API's) for accessing data in the data repository 42. The API's are high-level commands that each encompass a suitable combination of low-level access and management operations for accessing and manipulating data within the data repository 42 according to the schema employed in the database system 40. For example, a different API may be provided for each of the operations of modifying, storing and retrieving data with the data repository 42. Moreover, API's are typically vendor specific, so low-level access to a data repository without the use of the API's provided by the corresponding managed platform may not provide valid results.

Provided as an example only, the data repository 42 includes multiple tables 42a, 42b and 42c for storing data from corresponding records. That is, each of the tables 42a, 42b, and 42c stores a portion of a record (not shown) generally stored in the database system 40 according to a schema employed for deconstructing and storing a record within the database system 40. While only three tables 42a, 42b and 42c are shown in FIG. 1, those skilled in the art will appreciate that a fewer or a greater number of such tables may be included in a data repository.

In operation, data can be stored in and/or read from the data repository 42 using high-level API's or low-level access and management operations. The low-level access and management operations enable direct access to the tables 42a, 42b and 42c (or memory locations) in the data repository 42 so that data can be stored directly in and/or read directly from one or more of the tables 42a, 42b, and 42c. However, to use the low-level access and management operations successfully, knowledge of the storage and configuration schema employed within the database system 40 is required. Without such knowledge, the data retrieved and/or stored may not be valid or conform to the schema of the database system 40.

By contrast, the API's provided by the managed platform 41 provide indirect access to the data stored in the data repository 42 and also a level of certainty that the data recovered and/or stored will be valid and conform to the schema of the database system 40. For example, when storing a record in the database system 40 using the API's provided by the managed platform 41, the managed platform 41 deconstructs the record into portions that are properly stored in a suitable combination of the tables 42a, 42b and 42c by employing a suitable combination of low-level access and management operations for the task. Similarly, when retrieving a record stored in the database system 40 using the API's provided by the managed platform 41, the managed platform reconstructs the record from data in a corresponding combination of the tables 42a, 42b and 42c, again, by employing a suitable combination of low-level access and management operations for the task.

The management system 20 includes a data store 22 for storing a local replica of some of the data stored in the data repository 42. Those skilled in the art will also appreciate that the data store of a management system may store a local replica of data from multiple database systems and data repositories within the enterprise. The management system 20 also includes a data store interface 21, which performs an identical function to that of the managed platform 41 with respect to the data store 22 rather than the data repository 42. That is, data store interface 21 provides a suitable number of API's for accessing and storing data within the data store 22 in accordance with the specific schema implemented therein.

A management system (e.g. management system 20) often stores a local replica of some of the information stored in a remote data source (e.g. database system 40). In order to keep the information in various parts of the enterprise 100 current, a data synchronization (or reconciliation) process is used to propagate changes and updates throughout the enterprise 100. Previous approaches to the reconciliation process have a number of drawbacks and fail to effectively resolve the conflict between the desire for efficient resource utilization and the practical need to interchange, reconfigure and/or upgrade components within an enterprise.

With reference to FIG. 1, in a first approach, the reconciliation process involves a record-by-record comparison between the records stored in the database system 40 and the management system 20. In some implementations this process involves an adapter 30, as a part of a high-level access chain 32, that translates high-level commands, requests and data between the management system 20 and the database system 40. The adapter 30 receives high-level commands, requests and data from each of the management system 20 and the database system 40 in forms specific to each depending on the origin of the commands, requests or data. The adapter 30 then converts the high-level commands, requests or data into a form suitable for delivery to the other. That is, the adapter 30 effectively serves as middle-ware linking the data store interface 21 with the managed platform 41, so that the native API's of each can be employed to store and retrieve data. This approach is resource (time and processor) intensive and is generally very inefficient.

With continued reference to FIG. 1, second and third approaches attempt to resolve the drawbacks of the first approach by directly monitoring changes to the data repository 42 at a low-level and providing a low level-access chain 33 to translate changes detected to the management system 20. Specifically, according to the second approach, a change to the data in the data repository 42 is considered a triggering event that initiates a synchronization process directly between the data repository 42 and the management system 20. This approach avoids extracting all of the attributes (data portions of the record) using the managed platform 41. Instead, a trigger 44 is provided that is configured to monitor a change log (or database table and the like) and deliver notification of a change along with at least a portion of the modified data from the data repository 42 to the synchronization implementation 31 in the low-level access chain 33. However, information extracted using low-level access and management operations is not always valid because it is not extracted using the API's provided by the managed platform 41. In order to ensure validity (e.g. completeness), the synchronization implementation 31 translates the low-level data taken from the data repository 42 into a form that can be processed by the data store interface 21. This approach is inefficient because the data provided to the data store interface 21 often requires several transformations to convert the low-level data from the data repository 42 into a suitable form for the data store interface 21. Moreover, the transformation operations performed by the synchronization implementation 31 must be specific to the current configuration and version of the technology employed in the database system 40, and specifically the data repository 42. This means that the synchronization implementation 31 is susceptible to changes made to the database system 40 and may require substantial redesign each time the database system 40 is reconfigured, upgraded or when components of the database system 40 are changed.

Another drawback of this approach is that the data synchronization process is decoupled from the high-level control of the enterprise system 100 using the adapter 30. When an account or record is modified in response to a request from the management system 20, the modification will be detected within the database system as a low-level trigger event by the trigger 44. In turn, the trigger 44 will initiate a low-level synchronization process in which data is extracted from the data repository 42 and provided back to the management system 20 through the low-level access chain 33, which will process the same change for a second time. Moreover, by decoupling the data synchronization process from the high-level control of the enterprise system 100 there is also the risk of continuous loops forming in which the same change or set of changes is looped between the management system 20 and the database system 40 multiple times.

The third approach attempts to overcome the problems of the second approach by mapping changes to the data in the data repository 42 directly to the data store 22 within the management system 20. That is, changes to the data in the data repository 42 trigger a low-level synchronization process directly between the data store 22 and the data repository 42 rather than first transforming the data from the data repository 42 to a form that can be used by the data store interface 21. This approach may not be more efficient than the second approach when the storage schema employed by the data repository 42 and the data store 22 are different. In such cases, mapping of data between the two may be as complex as the transformation of data into a form that can used by the data store interface 21. Furthermore, this third approach is even more adversely sensitive to reconfiguration and schema changes made in either the data repository 42 or the data store 22 than the second approach.

In contrast to prior data synchronization processes, provided by aspects of the invention are systems, methods and software programs implementing a data synchronization process that employs a high-level interface of a respective data repository to extract valid information from the data repository in response to low-level changes in the data repository. In specific embodiments of the invention, the synchronization process is implemented within an adapter interposed between a management system and a database system that serves as middle-ware operable to link a respective data store interface, within a management system, to a respective managed platform, within the database system, so that the native API's of each can be employed in the operation of the data synchronization process.

A more detailed description of various aspects of a data synchronization process (reconciliation method) in accordance with aspects of the invention is provided below with reference to FIGS. 2, 3 and 4. However, briefly, a data synchronization process according aspects of the invention includes monitoring a data repository in order to identify a change to the data stored and to retrieve a minimal amount of information needed to identify the account (or record) or subset of accounts (or subset of records) affected by the change. For example, the names or identification numbers of accounts (or records) affected by a change are identified. The identification of the accounts (or records) is passed to an adapter, which in turn employs the native API's of a managed platform to retrieve valid information from the data repository about the accounts identified as being affected by the change. That is, the data in the accounts is not retrieved directly by the adapter using low-level access and management operations, and instead the adapter relies on native API's to retrieve the data to ensure validity. In this way, there is no need for the adapter to be configured to take into account knowledge of the schema employed by the data repository. For example, the valid information may be, without limitation, a complete or partial record retrievable using the native API's provided by the managed platform. The valid information retrieved from the data repository is then provided back to the management system as an update for the data store within the management system, so long as the change was the result of a modify request sent by the management system. Additionally and/or alternatively, the data synchronization process according to aspects of the invention can be implemented to synchronize data between two or more database systems (or data repositories and the like), wherein each database system stores at least some information that is also stored in one or more other databases (or data repositories and the like).

Aspects of the invention may be embodied in a number of forms. For example, various aspects of the invention can be embodied in a suitable combination of hardware, software and firmware. In particular, some embodiments include, without limitation, entirely hardware, entirely software, entirely firmware or some suitable combination of hardware, software and firmware. In a particular embodiment, the invention is implemented in a combination of hardware and firmware, which includes, but is not limited to firmware, resident software, microcode and the like.

Additionally and/or alternatively, aspects of the invention can be embodied in the form of a computer program product that is accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by, or in connection with, the instruction execution system, apparatus, or device.

A computer-readable medium can be an electronic, magnetic, optical, electromagnetic, infrared, or semiconductor system (or apparatus or device) or a propagation medium. A computer-readable storage medium can include a semiconductor and/or solid-state memory, magnetic tape, a removable computer diskette, a random access memory (RAM), a read-only memory (ROM), a rigid magnetic disk and an optical disk. Current examples of optical disks include, without limitation, compact disk—read only memory (CD-ROM), compact disk—read/write (CD-R/W) and DVD.

In accordance with aspects of the invention, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Additionally and/or alternatively, in accordance with aspects of the invention, a data processing system suitable for storing and/or executing program code will include at least one processor integrated with memory elements through a system bus.

Input/output (i.e. I/O devices)—including but not limited to keyboards, touch-pads, displays, pointing devices, etc.—can be coupled to the system either directly or through intervening I/O controllers.

Network adapters may also be coupled to the system to enable communication between multiple data processing systems, remote printers, or storage devices through intervening private or public networks. Modems, cable modems and Ethernet cards are just a few of the currently available types of network adapters.

Figure 2:
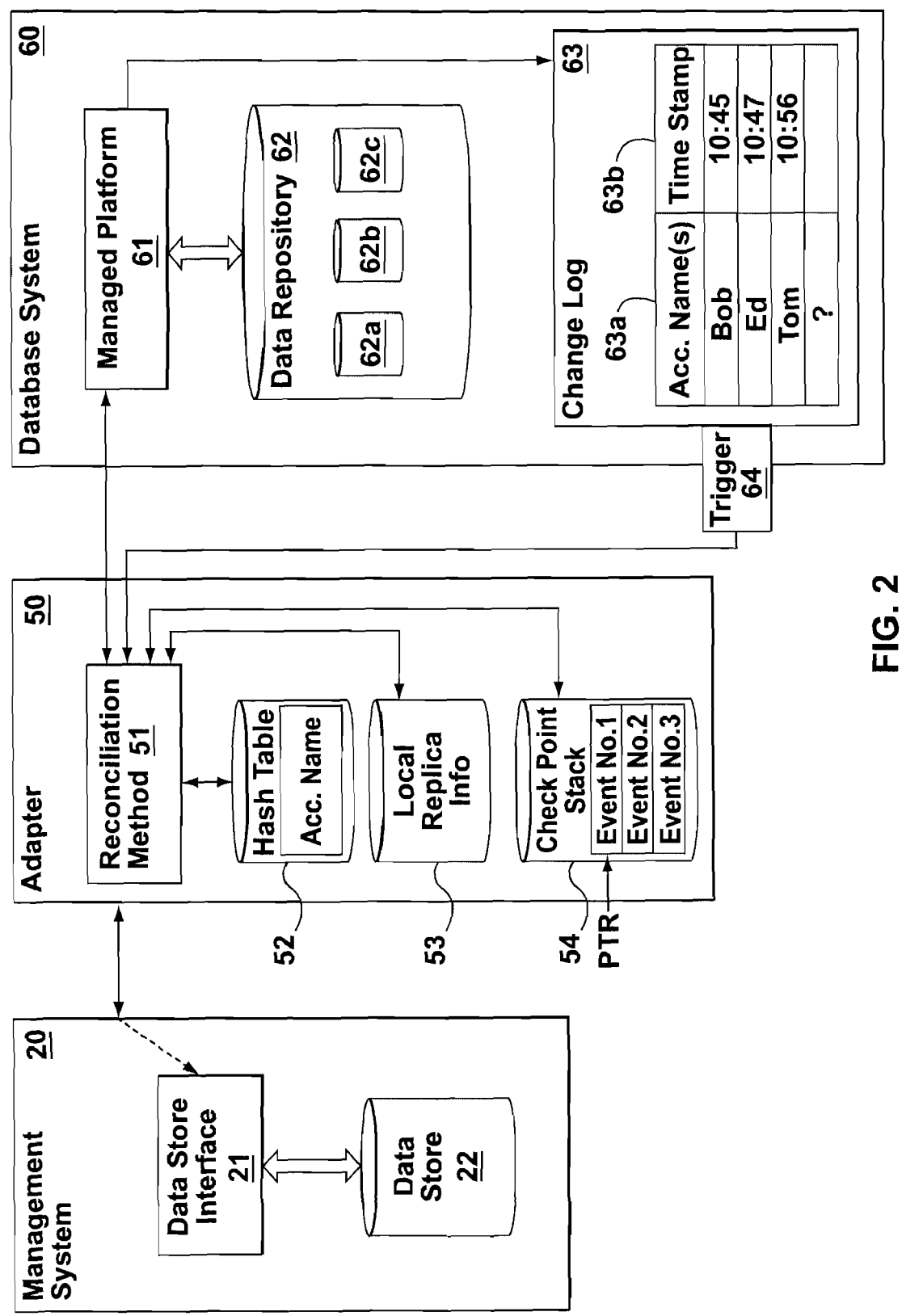
FIG. 2 is schematic illustration of a portion of an enterprise system provided to help describe aspects of a data synchronization process according to aspects of the invention.

FIG. 2 is schematic illustration of a portion of an enterprise system 200 provided to help describe aspects of a data synchronization (reconciliation) process according to aspects of the invention. The enterprise system 200 includes elements in common with the enterprise system 100 illustrated in FIG. 1, and accordingly common elements in the two figures are identified with the same reference indicia.

With specific reference to FIG. 2, the enterprise system 200 includes a management system 20 and a database system 60. In accordance with aspects of the invention, the enterprise system 200 also includes an adapter 50 interposed between the management system 20 and the database system 60 that provides an implementation of a reconciliation method 51 according to aspects of the invention. Moreover, while the enterprise system 100 illustrated in FIG. 2 includes only one management system and one database system, those skilled in the art will appreciate that an enterprise system may include any suitable combination of one or more management systems and one or more database systems, along with any suitable combination of hardware, software and firmware required to implement the desired functionality of the particular enterprise system. Thus, only elements necessary to describe aspects of the invention have been included in FIG. 2.

The database system 60 includes a managed platform 61, a data repository 62, a change log 63 and a trigger 64. The managed platform 61 serves as an interface to the data repository 62, providing API's for accessing data in the data repository 62.

Provided as an example only, the data repository 62 includes multiple tables 62a, 62b and 62c for storing data from corresponding records or accounts. That is, each of the tables 62a, 62b, and 62c stores a portion of a record (not shown) stored in the database system 60 according to a schema employed for deconstructing and storing a record. While only three tables 62a, 62b and 62c are shown in FIG. 2, those skilled in the art will appreciate that a fewer or a greater number of such tables may be included in a data repository.

The change log 63, which is used to keep an account of changes to data in the data repository 62 includes, without limitation and for example only, an account name (or record name) field 63a and a time stamp field 63b. The time stamp field 63b is used to store a time value (and possibly a date value) corresponding to when a respective account in the account name field 63a was modified. For example, an account that has been modified more than once may be included in the account name field 63a more than once, with each entry having a respective time value. Those skilled in the art will appreciate that a change log may include additional fields that provide additional details about the specific changes made to the data within the data repository 62. For example, the change log may include fields that maintain a tally of how many times a particular account (or record) has been modified, the frequency with which an account (or record) is modified, or what information was changed within the account (or record).

In operation, data can be stored in and/or read from the data repository 62 using high-level API's or low-level access and management operations. The low-level access and management operations enable direct access to the tables 62a, 62b and 62c (or memory locations) in the data repository 62 so that data can be stored directly in and/or read directly from one or more of the tables 62a, 62b, and 62c. However, to use the low-level access and management operations successfully knowledge of the storage and configuration schema employed within the database system 60 is required. Without such knowledge, the data retrieved and/or stored may not be valid or conform to the schema of the database system 60.

By contrast, the API's provided by the managed platform 61 provide indirect access to the data stored in the data repository 62 and also a level of certainty that the data recovered and/or stored will be valid and conform to the schema of the database system 60. For example, when storing a record in the database system 60 using the API's provided by the managed platform 61, the managed platform 61 deconstructs the record into portions that are properly stored in a suitable combination of the tables 62a, 62b and 62c by employing a suitable combination of low-level access and management operations for the task. Similarly, when retrieving a record stored in the database system 60 using the API's provided by the managed platform 61, the managed platform reconstructs the record from data in a combination of the tables 62a, 62b and 62c, again, by employing a suitable combination of low-level access and management operations for the task. Irrespective of how the data in the data repository 62 is stored or modified (or otherwise manipulated), the detected changes are accounted for in the change log 63.

Additionally and/or alternatively, the change log 63 may be replaced with an audit log of the type maintained by a Lightweight Directory Access Protocol (LDAP) or another type of stored data within the database system 60 that provides accurate information about changes in the data stored in the data repository 62.

Similar to FIG. 1, the management system 20 in FIG. 2 includes a data store 22 for storing a local replica of some of the data stored in the data repository 62. Those skilled in the art will appreciate that the data store of a management system may store a local replica of data from multiple database systems and data repositories within the enterprise. The management system 20 also includes a data store interface 21, which performs an identical function to that of the managed platform 61 with respect to the data store 22 rather than the data repository 62. That is, data store interface 21 provides a suitable number of API's for accessing and storing data within the data store 22 in accordance with the specific schema implemented therein.

The adapter 50 provides an implementation of a reconciliation (synchronization) method 51 according to aspects of the invention. In addition to the implementation of the reconciliation method 51, the adapter 50 includes a hash table 52, a checkpoint stack 54, that includes a pointer PTR, and a memory allocation for local replica information 53. Each of the hash table 52, the checkpoint stack 54 and the memory allocation for local replica information 53 includes an amount of memory that may be either statically or dynamically assigned. Moreover, while the hash table 52, the checkpoint stack 54 and the memory allocation for local replica information 53 are shown in FIG. 2 as being separate from one another, those skilled in the art will appreciate that the hash table 52, the checkpoint stack 54 and the memory allocation for local replica information 53 may each be allocated within one or more memory components managed by a common controller (not shown) or allocated virtually within a single memory component, such as a hard-drive or flash memory. Moreover, the adapter 50 may be implemented using a suitable combination of software, hardware and firmware. For example, in one embodiment the reconciliation method 51 may be implemented in a software program operable on a server computer that also provides memory allocations for the hash table 52, the checkpoint stack 54 and the memory allocation for the local replica information 53. In another embodiment, the reconciliation method 51 may be implemented on a server computer also hosting another element of the enterprise system 200, such as for example, the management system 20. Additionally and/or alternatively, all or only portions of the adapter 50 may be implemented within a custom integrated circuit or Field Programmable Gate Array (FPGA) in combination with a memory component.

In order that the data stored throughout the enterprise 200 is current and accurate, the data stored in the data repository 62 and the data store 22 should be synchronized (i.e. reconciled) to detect and resolve any discrepancies in the data that is common to both the data repository 62 and the data store 22. As noted above, previous approaches to reconciliation fail to effectively resolve the conflict between the desire for efficient resource utilization and the practical need to interchange, reconfigure and/or upgrade components within an enterprise. In contrast, provided by aspects of the present invention, the adapter 50 provides a data synchronization process that primarily uses high-level native API's, and thus, is relatively less dependent on changes to the internal data structures in the database system 60 and the management system 20 while also being less resource intensive than some other previous approaches.

The adapter 50 provides a process for data synchronization between the management system 20 and the database system 60 that occurs in response to changes made to the data repository 62. For the sake of simplicity, the example described herein provides an explanation for how the changes to the data repository 62 are conveyed as updates to the data store 22 only. However, those skilled in the art will appreciate that the process described can also be implemented to provide the reciprocal effect of providing updates to the data repository 62 in response to changes to the data store 22 after reviewing the following.

In operation, the trigger 64 is configured to send a message to the adapter 50 if a change is detected in the data repository 62. Typically, managed databases do not have an exposed mechanism to report such changes. In accordance with some aspects of the invention the trigger 64 is configured to monitor the change log 63. Additionally and/or alternatively, the trigger 64 may be configured to monitor a table in a database or records in an audit log. The message sent from the trigger 64 to the adapter 50 contains a minimal amount of information about the change that has occurred in the data repository 62. For example, in some embodiments, only an account name from the account name field 63a in the change log 63 is sent. In other embodiments, the account name may be provided along with a corresponding time stamp for the change from the time stamp field in the change log 63. In even other embodiments, more information may be sent to the adapter 50 depending on the information available in the change log (or the like). However, the more information that is sent to the adapter 50, the more resource intensive the data synchronization process becomes.

The message from the trigger 64 is treated as an indication of a change event within the data repository 62. The adapter 50 is configured to parse the message received from the trigger 64 to determine the name of the account or subset of accounts affected by the change. The change event is pushed onto the checkpoint stack 54. In some embodiments, this is implemented by pushing the memory location of the account or subset of accounts affected by a change onto the checkpoint stack 54. The pointer PTR is controlled to point to the earliest change event detected that has yet to be processed by adapter 50.

The reconciliation method 51 processes change events in order of first to last. As a result, the checkpoint stack 54 can be advantageously implemented as a First-In-First-Out (FIFO) stack. Starting at the earliest change event received, the reconciliation method 51 checks to determine if the accounts affected by the change event being processed are within the hash table 52. If the account names are within the hash table 52, the change event is ignored and both the first instance of the account name is deleted from the hash table 52 and the checkpoint pointer PTR is advanced, which can be done by popping from the checkpoint stack 54. If one or more of the account names are not within the hash table 52, the adapter 50 employs the native API's of the managed platform 61 to retrieve the attributes of the accounts affected by the change in the data repository 62. The adapter 50 then sends the valid information containing the attributes of the affected accounts to the data store interface 21 having using the native API's provided therein and waits for an acknowledgment for a period of time (which may be random or preset). The acknowledgment is a confirmation to the adapter 50 that update sent to the data store interface 21 arrived and is valid. If an acknowledgment or error signal is not received the adapter 50 will re-send the updates for the event pointed to by the checkpoint pointer PTR. Once the acknowledgment is received both the first instance of an account name is deleted from the hash table 52 and the checkpoint pointer PTR is advanced by popping from the checkpoint stack 54. Subsequently, the adapter 50 waits for the next event if the checkpoint stack 54 is empty or processes the next event listed in the checkpoint stack 54.

If the change originates as a request from the management system 20, the adapter 50, upon receiving the request, first identifies the names of the accounts (or records) that will be affected by the change requested. The names are added to the hash table 52 before the request is passed to the managed platform 61 employing the native API's provided therein. The names in the hash table 52 provide a reference to which change events are compared as described above. If the name of an account is in the hash table 52 and a change event is detected that affects that same account, the change event is considered to have originated from the request passed to the managed platform 61 from the management system 20. Accordingly, the change event is ignored and an update is not sent to the management system 20. The result is that the looping of information between the management system 20 and the database system 60 is stopped. In some embodiments, timing information, such as that from the time stamp field 63b, may be considered to validate that a change event detected corresponds to a change request that was originally sent by the management system 20.

Additionally and/or alternatively, the adapter 50 can optionally employ the memory allocation for local replica information 53. The data stored in the memory allocation for the local replica information 53 is a copy of the updates that have been sent to the management system 20 by the adapter 50. If this option is provided for, the likelihood of sending more than one update with the same information in an account stored in the data repository 62 can be reduced by first checking to see if the supposed updated information is different from a previous update sent to the management system 20 with respect to a particular account or whether it is relevant information about the particular account that the management system 20 stores or needs.

Figure 3:
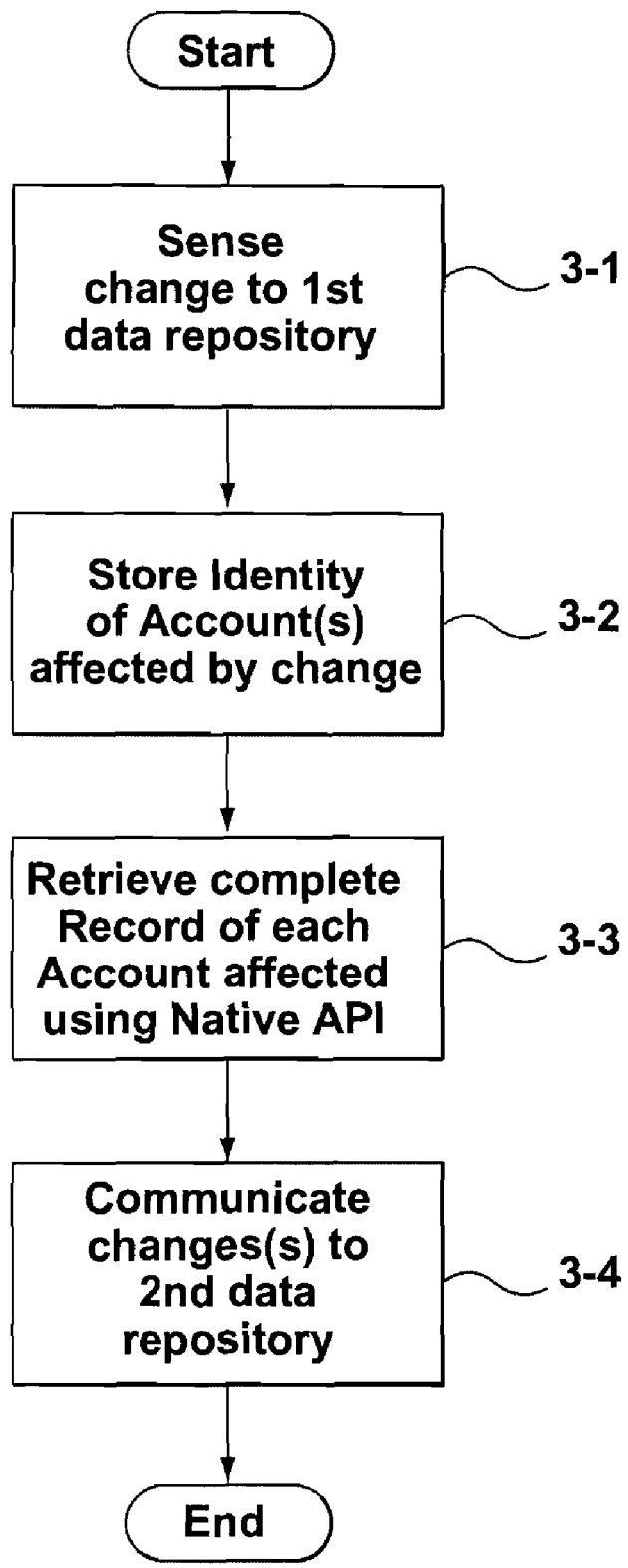
FIG. 3 is a flow chart illustrating general method steps for synchronizing data between two data repositories in accordance with aspects of the invention.
Figure 4:
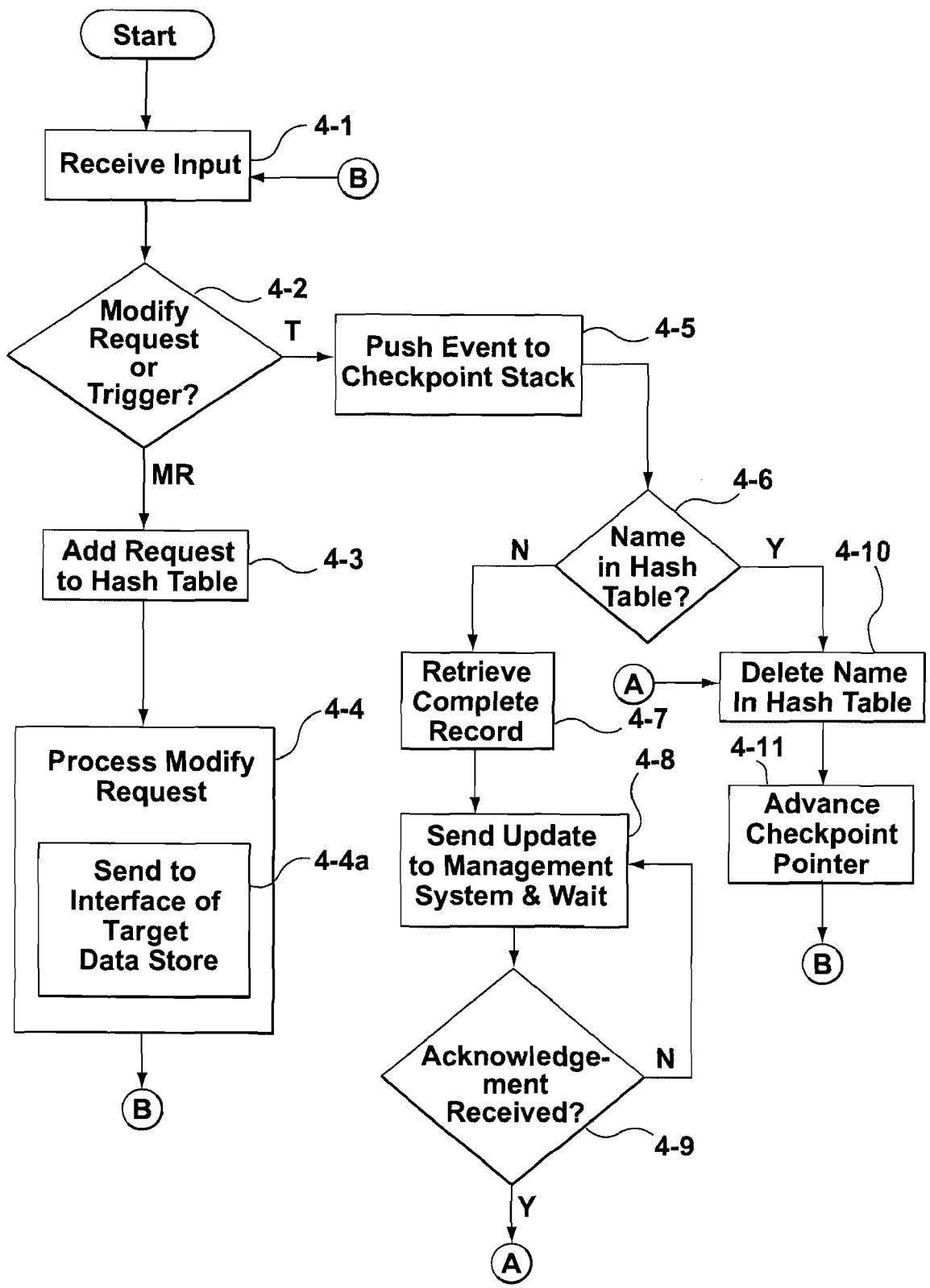
FIG. 4 is a flow chart illustrating more specific method steps for synchronizing data between two data repositories in accordance with aspects of the invention.

For further clarification, aspects of the above description of the operation of the reconciliation method 51 implemented in the adapter 50 according to aspects of the invention are depicted in the flow charts provided in FIGS. 3 and 4.

Referring first to FIG. 3, shown is a flow chart illustrating the general method steps for synchronizing data between two data repositories in accordance with aspects of the invention. Starting at step 3-1, the reconciliation method includes sensing a change to the data stored in a first data repository (e.g. data repository 62). As noted above, this step may be specifically implemented by monitoring corresponding changes listed in a change log 63 or the like. At step 3-2, the reconciliation method includes storing the identity of the accounts affected by the change. Step 3-3 of the reconciliation method includes retrieving attributes of the accounts affected by the change using the native API's of the interface for the first data repository. Finally, at step 3-4, the reconciliation method includes communicating the changes to the information in the affected account(s) to a second data repository (e.g. data store 22), that also stores at least some of the information contained in the affected account(s), using the native API's of the interface of the second data repository.

Turning to FIG. 4, shown is a flow chart illustrating more specific method steps for synchronizing data between two data repositories in accordance with aspects of the invention. Starting at step 4-1, the reconciliation method includes receiving an input and/or checking a checkpoint stack to process outstanding inputs. At step 4-2, the reconciliation method includes determining whether the input received is a change event trigger received in response to a change made within a first data repository or a modify request sent from the interface of a second data repository (or management system). If the received input is a modify request (MR path, step 4-2), the reconciliation method proceeds to step 4-3, which includes adding the name of the account affected by the request to a hash table. At step 4-4, the reconciliation method includes processing the modify request, which includes sending the modify request to the interface of the first data repository using native API's provided therein.

On the other hand, if the received input is a change event trigger (T path, step 4-2), the reconciliation method proceeds to step 4-5, which includes pushing the name of the account affected by the request onto a checkpoint stack. At step 4-6, the reconciliation method includes determining whether or not the name of the account affected is within the hash table. If the name of the account affected is within the hash table (yes path, step 4-6), the method proceeds to step 4-10 which includes deleting the name from the hash table and advancing the checkpoint pointer (e.g. PTR) to the next event (represented by an account name) in the checkpoint stack. The reconciliation method then proceeds back to step 4-1.

On the other hand, if the name of the account affected is not within the hash table (no path, step 4-6), the method proceeds to step 4-7 which includes retrieving attributes (or the complete record) of the account(s) affected by the change. Then at step 4-8, the reconciliation method includes sending an update to the interface of the second data repository (e.g. management system 20) and waiting for an acknowledgment. At step 4-9, the reconciliation method includes determining whether an acknowledgment has been received. If the acknowledgment has not been received (no path, step 4-9), the reconciliation method loops back to step 4-8. Alternatively, if the acknowledgment has been received (yes path, step 4-9), the reconciliation method proceeds to step 4-10.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above disclosure.

The invention claimed is:

1. A method for synchronizing data stored in first and second data repositories, wherein each of the first and second data repositories have an interface providing native Application Program Interface commands (API's) that each encompass a suitable combination of low-level access and management operations for accessing and manipulating data within the respective data repository, the method comprising:
   receiving a change to the data stored in the first data repository, wherein receiving the change to the data repository comprises receiving notification from a trigger configured to detect changes to the data stored in the first data repository and provide said notification;
   providing a checkpoint stack;
   storing a respective identification of an account affected by the change;
   accepting an input containing an indication of the change to the data in the first data repository;
   determining if the change can be traced to a previous modify request sent from a system managing the second data repository, and providing an update to the second data repository using native API's of the interface of the second data repository only if the change cannot be traced back to the previous modify request sent from the system managing the second data repository;
   determining if the indication of the change is provided by the trigger or if the indication of the change is a modify request provided by the system managing the second data repository;
   if the indication of the change is a modify request provided by the system managing the second data repository, storing a respective identification of the account affected by the change in the modify request in a hash table; and
   if the indication of the change is provided by the trigger and the change cannot be traced to the previous modify request sent from the system managing the second data repository, retrieving at least a portion of the data in the account affected by the change using native API's of the interface of the first data repository and the respective identification of the account.

2. A method according to claim 1, wherein the trigger is configured to monitor at least one of a change log, an audit log, a table in a database for storing change information, and a memory allocation for storing change information.

3. A method according to claim 1, wherein the notification from the trigger includes the respective identification of the account affected by the change.

4. A method according to claim 1:
   wherein the hash table is provided for storing the respective identification of the account affected by the change to the data in the first data repository when the change is originally from a system managing the second data repository; and
   wherein the checkpoint stack is provided for storing a sequential listing of change events detected in the first data repository, the checkpoint stack including a pointer, the pointer configured to point to the earliest change event detected in the first data repository that has yet to be processed, wherein the change events are an indication of an account or subset of accounts affected by a change to the data in the first data repository.

5. A method according to claim 1 further comprising sending the modify request to the interface of the first data repository if the indication of the change is a modify request provided by the system managing the second data repository.

6. A method according to claim 1, wherein determining if a change can be traced to a previous modify request sent from a system managing the second data repository comprises:
   pushing an indication of a change event onto the checkpoint stack;
   using the pointer of the checkpoint stack to identify the account corresponding to and affected by the earliest change event detected in the first data repository that has yet to be processed;
   determining if the respective identification of the account in the hash table; and
   providing an update to the second data repository if the respective identification of the account is not in the hash table; and otherwise, deleting the respective identification of the account from the hash table and advancing the checkpoint stack pointer to the next change event.

7. A method according to claim 6, wherein providing an update to the second data repository comprises:
retrieving at least a portion of the data of the account affected by the change using the native API's of the interface of the first data repository; and
communicating a portion of the data retrieved as an update to the second data repository using the native API's of the interface of the second data repository.

8. A method according to claim 7 further comprising:
waiting for an acknowledgment from one of the interface of the second data repository and a system managing the second data repository;
if an acknowledgment is not received after a period of time, re-sending the update to the second data repository using the native API's of the interface of the second data repository; and
once the acknowledgment is received, deleting the respective identification of the account from the hash table and advancing the checkpoint stack pointer.

9. A method according to claim 8 further comprising:
sequentially processing change events listed in the checkpoint stack until the checkpoint stack is empty; and
when the checkpoint stack is empty, processing notifications of change events as received from the trigger.

10. A system for synchronizing data stored in first and second data repositories, wherein each of the first and second data repositories have an interface providing native Application Program Interface commands (API's) that each encompass a suitable combination of low-level access and management operations for accessing and manipulating data within the respective data repository, the system comprising:
a data processor coupled to a memory and operable for executing instructions in the memory to perform steps of:
receiving a change to the data stored in the first data repository, wherein receiving the change to the data repository comprises receiving notification from a trigger configured to detect changes to the data stored in the first data repository and provide said notification;
providing a checkpoint stack;
storing a respective identification of an account affected by the change;
accepting an input containing an indication of the change to the data in the first data repository;
determining if the change can be traced to a previous modify request sent from a system managing the second data repository, and providing an update to the second data repository using native API's of the interface of the second data repository only if the change cannot be traced back to the previous modify request sent from the system managing the second data repository;
determining if the indication of the change is provided by the trigger or if the indication of the change is a modify request provided by the system managing the second data repository;
if the indication of the change is a modify request provided by the system managing the second data repository, storing a respective identification of the account affected by the change in the modify request in a hash table; and
if the indication of the change is provided by the trigger and the change cannot be traced to the previous modify request sent from the system managing the second data repository, retrieving at least a portion of the data in the account affected by the change using native API's of the interface of the first data repository and the respective identification of the account.

11. A system according to claim 10 further comprising a trigger configured to sense changes to the data stored in the first data repository and report the respective identification of the account affected by the change.

12. An apparatus including a data processor for synchronizing data stored in first and second data repositories, wherein each of the first and second data repositories have an interface providing native Application Program Interface commands (API's) that each encompass a suitable combination of low-level access and management operations for accessing and manipulating data within the respective data repository, the apparatus comprising:
a hash table, the hash table for storing respective identification for accounts affected by a change to the data in the first data repository when the change is originally from a system managing the second data repository;
a checkpoint stack for storing a sequential listing of change events detected in the first data repository, the checkpoint stack including a pointer, the pointer configured to point to the earliest change event detected in the first data repository that has yet to be processed, wherein the change events are an indication of an account or subset of accounts affected by a change to the data in the first data repository;
an implementation of a data synchronization method, wherein the method includes sensing a change to the data stored in the first data repository; storing a respective identification of an account affected by the change in at least one of the hash table and the checkpoint stack; retrieving at least a portion of the data in the account affected by the change using native API's of the interface of the first data repository and the respective identification of the account; and communicating some of the data retrieved as an update to the second data repository using native API's of the interface of the second data repository; and
a trigger configured to sense changes to the data stored in the first data repository and report the respective identification of the account affected by the change, wherein the implementation of the data synchronization method comprises:
accepting an input containing an indication of a change to the data in the first data repository;
determining if the indication of the change is provided by the trigger or if the indication of the change is a modify request provided by a system managing the second data repository;
if the indication of the change is provided by the trigger, determining if the change can be traced to a previous modify request sent from a system managing the second data repository, and providing an update to the second data repository only if the change cannot be traced back to the modify request sent from a system managing the second data repository; and
if the indication of the change is a modify request provided by a system managing the second data repository, storing a respective identification of the account affected by the change in the modify request in the hash table.

13. An apparatus according to claim 12, wherein determining if a change can be traced to a previous modify request sent from a system managing the second data repository comprises:
pushing an indication of a change event onto the checkpoint stack;

using the pointer of the checkpoint stack to identify the account corresponding to and affected by the earliest change event detected in the first data repository that has yet to be processed;

determining if the respective identification of the account in the hash table; and providing an update to the second data repository if the respective identification of the account is not in the hash table; and otherwise, deleting the respective identification of the account from the hash table and advancing the checkpoint stack pointer to the next change event.

14. An apparatus according to claim 13, wherein providing an update to the second data repository comprises:

retrieving at least a portion of the data of the account affected by the change using the native API's of the interface of the first data repository; and communicating a portion of the data retrieved as an update to the second data repository using the native API's of the interface of the second data repository.

15. A computer program product implementing a method of data synchronization between first and second data repositories, wherein each of the first and second data repositories have an interface providing native Application Program Interface commands (API's) that each encompass a suitable combination of low-level access and management operations for accessing and manipulating data within the respective data repository, the computer program product comprising computer program instructions stored in a computer readable storage medium for:

receiving a change to the data stored in the first data repository, wherein receiving the change to the data repository comprises receiving notification from a trigger configured to detect changes to the data stored in the first data repository and provide said notification;

providing a checkpoint stack;

storing a respective identification of an account affected by the change;

accepting an input containing an indication of the change to the data in the first data repository;

determining if the change can be traced to a previous modify request sent from a system managing the second data repository, and providing an update to the second data repository using native API's of the interface of the second data repository only if the change cannot be traced back to the previous modify request sent from the system managing the second data repository;

determining if the indication of the change is provided by the trigger or if the indication of the change is a modify request provided by the system managing the second data repository;

if the indication of the change is a modify request provided by the system managing the second data repository, storing a respective identification of the account affected by the change in the modify request in a hash table; and if the indication of the change is provided by the trigger and the change cannot be traced to the previous modify request sent from the system managing the second data repository, retrieving at least a portion of the data in the account affected by the change using native API's of the interface of the first data repository and the respective identification of the account.

16. A computer program product according to claim 15 wherein the trigger is configured to monitor at least one of a change log, an audit log, a table in a database for storing change information, and a memory allocation for storing change information, and wherein the notification from the trigger includes the respective identification of the account affected by the change.

17. A computer program product according to claim 15:

wherein the hash table is provided for storing the respective identification of the account affected by the change to the data in the first data repository when the change is originally from a system managing the second data repository; and wherein the checkpoint stack is provided for storing a sequential listing of change events detected in the first data repository, the checkpoint stack including a pointer, the pointer configured to point to the earliest change event detected in the first data repository that has yet to be processed, wherein the change events are an indication of an account or subset of accounts affected by a change to the data in the first data repository.

18. A computer program product according to claim 15 further comprising computer program instructions for:

pushing an indication of a change event onto the checkpoint stack;

using the pointer of the checkpoint stack to identify the account corresponding to and affected by the earliest change event detected in the first data repository that has yet to be processed;

determining if the respective identification of the account in the hash table; and providing an update to the second data repository if the respective identification of the account is not in the hash table; and otherwise, deleting the respective identification of the account from the hash table and advancing the checkpoint stack pointer to the next change event.

19. A computer program product according to claim 18 further comprising computer program instructions for:

retrieving at least a portion of the data of the account affected by the change using the native API's of the interface of the first data repository; and communicating a portion of the data retrieved as an update to the second data repository using the native API's of the interface of the second data repository.

20. A computer program product according to claim 19 further comprising computer program instructions for:

waiting for an acknowledgment from one of the interface of the second data repository and a system managing the second data repository;

if an acknowledgment is not received after a period of time, re-sending the update to the second data repository using the native API's of the interface of the second data repository; and once the acknowledgment is received, deleting the respective identification of the account from the hash table and advancing the checkpoint stack pointer.

21. A computer program product according to claim 20 further comprising computer program instructions for:

sequentially processing change events listed in the checkpoint stack until the checkpoint stack is empty; and when the checkpoint stack is empty, processing notifications of change events as received from the trigger.

* * * * *